No. 778,897. PATENTED JAN. 3, 1905.
L. J. ROBB & W. M. ROSEWATER.
MOTOR CONTROL FOR HOISTING BUCKETS.
APPLICATION FILED DEC. 19, 1903.
3 SHEETS—SHEET 1.
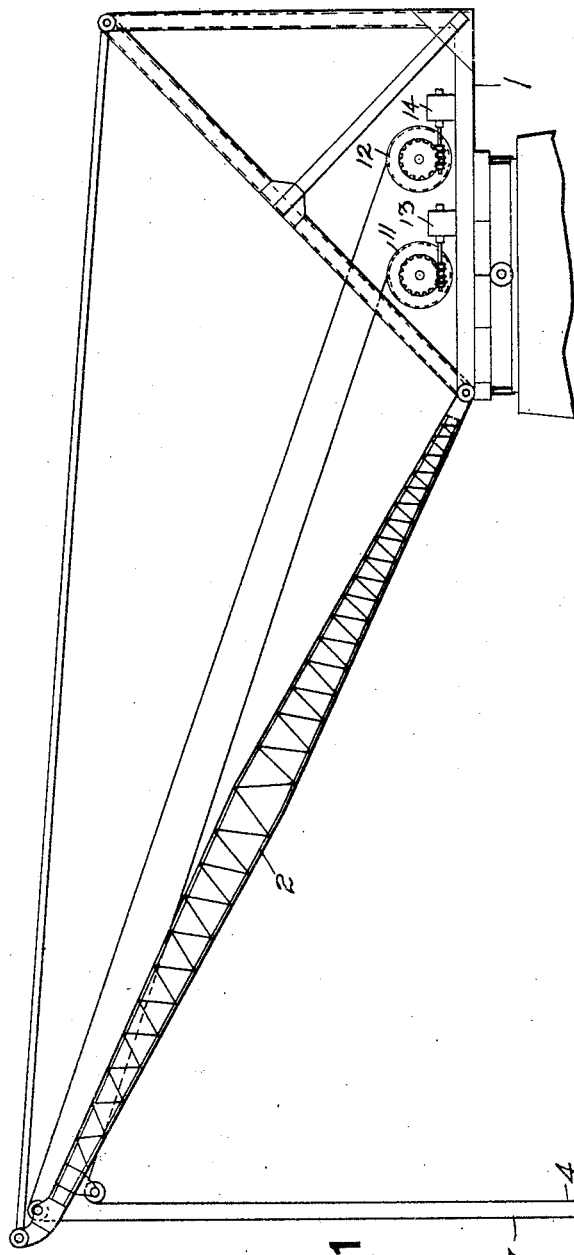
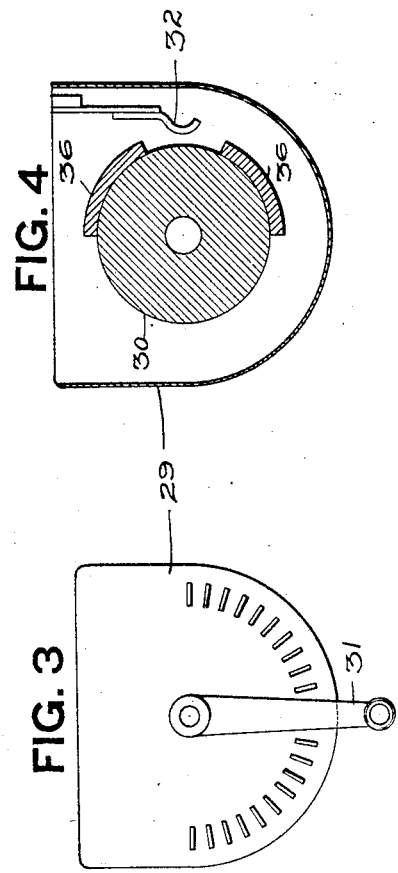
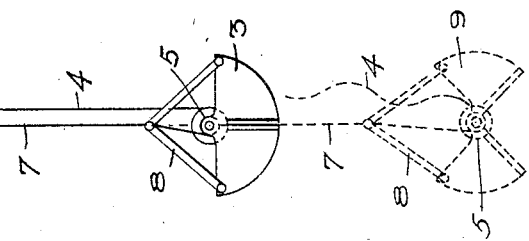
WITNESSES.
INVENTORS.

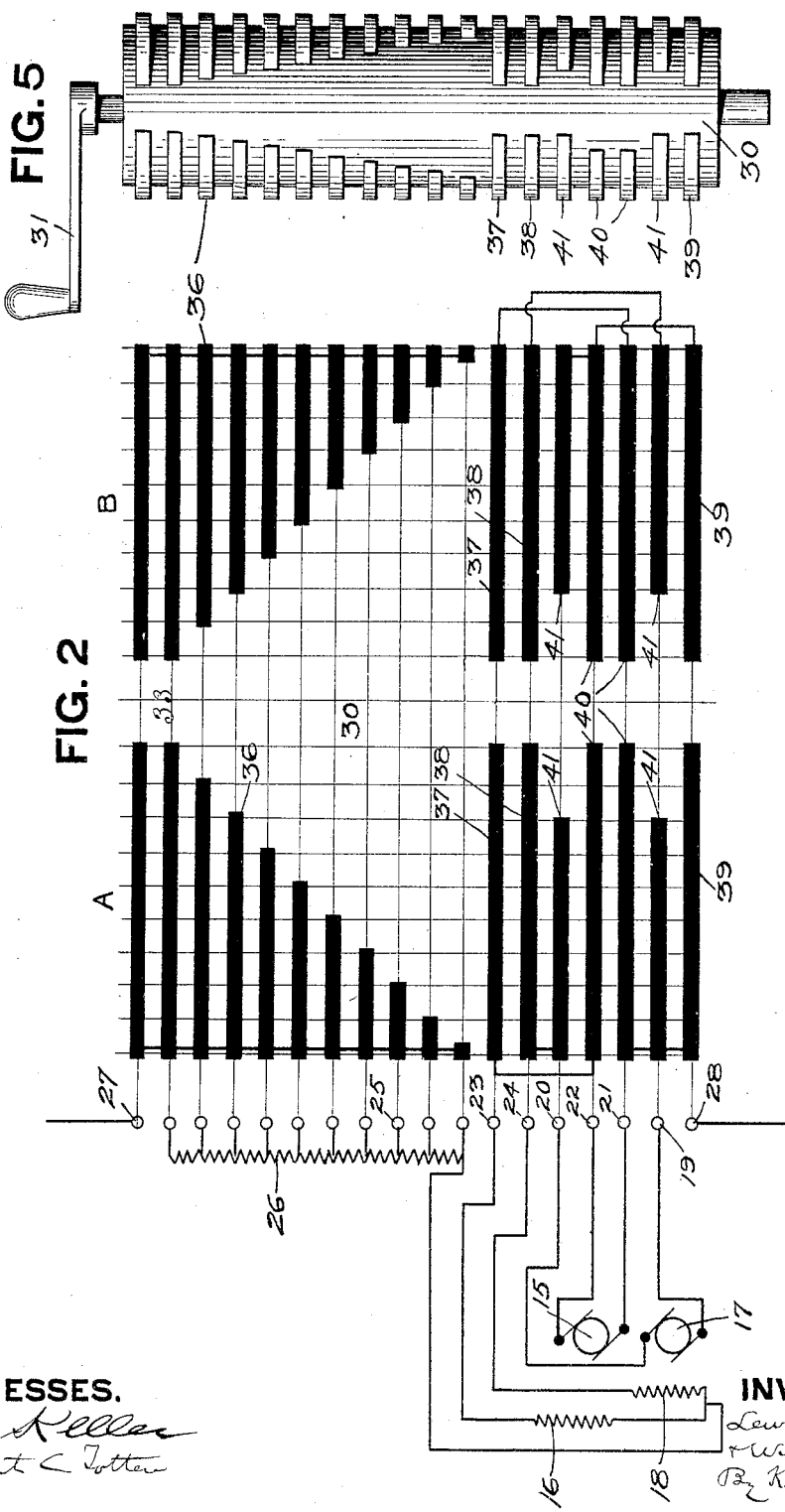

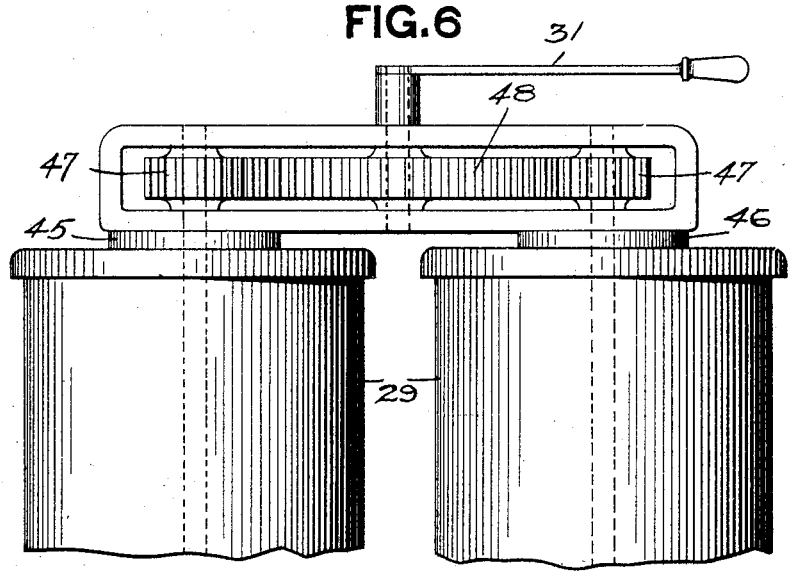
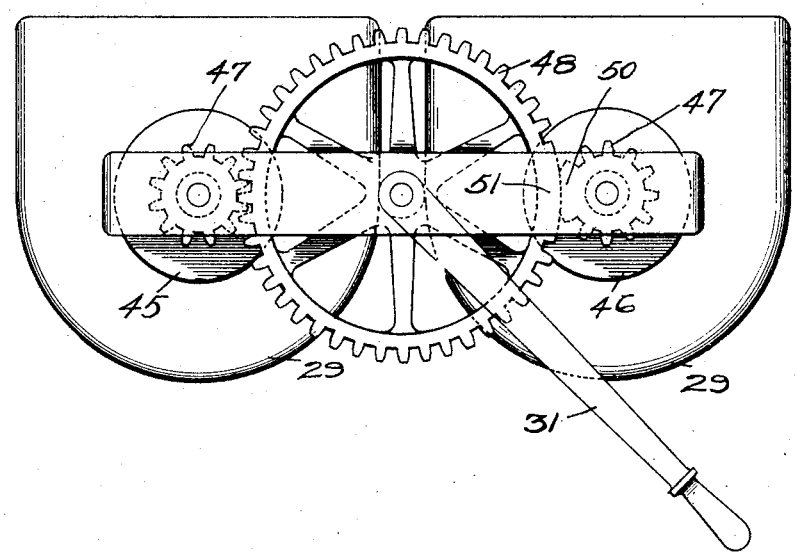

No. 778,897. Patented January 3, 1905.

UNITED STATES PATENT OFFICE.

LEWIS J. ROBB AND WILLIAM M. ROSEWATER, OF PITTSBURG, PENNSYLVANIA, ASSIGNORS TO HEYL AND PATTERSON, OF PITTSBURG, PENNSYLVANIA, A PARTNERSHIP UNDER THE LAWS OF PENNSYLVANIA.

MOTOR CONTROL FOR HOISTING-BUCKETS.

SPECIFICATION forming part of Letters Patent No. 778,897, dated January 3, 1905.

Application filed December 19, 1903. Serial No. 185,827.

*To all whom it may concern:*

Be it known that we, LEWIS J. ROBB and WILLIAM M. ROSEWATER, residents of Pittsburg, in the county of Allegheny and State of Pennsylvania, have invented a new and useful Improvement in Motor Control for Hoisting-Buckets; and we do hereby declare the following to be a full, clear, and exact description thereof.

Our invention relates to controlling mechanism for digging, dredging, and similar buckets; and the object is to provide controlling mechanism whereby the bucket can be closed, hoisted, lowered, and opened by the manipulation of a single controlling-lever.

There are on the market at present a number of different types of automatic closing and opening buckets, such as clam-shell buckets and other forms, which are used for digging and dredging purposes and also for the purpose of loading and unloading material such as coal, ore, and the like. All forms of these buckets are so arranged that by pulling on one cable connected thereto, usually called the "hoisting-cable," the bucket will be closed and can then be carried on such cable to any desired position, when by holding on to another cable, usually called the "holding-cable," and slackening the hoisting-cable the bucket will automatically open. The usual practice in the use of these buckets is to suspend the same by means of the holding and hoisting cables from the end of the boom of a crane or other suitable movable frame and to connect the holding and hoisting cables to independent motors, either steam-engines or electric motors. In prior uses, however, so far as we are aware, there have been no connection between the two motors, so that it has required separate and independent manipulations or operations on the part of the attendant to operate the two motors to effect the opening, closing, hoisting, and lowering of the bucket. This necessitates some degree of skill on the part of the operator, care in starting and stopping the motors at just the right time, and may result in some loss of time in manipulating the two separate controlling devices.

The object of our invention is to provide for motors used in connection with automatic opening and closing buckets controlling means so arranged that by the act of moving a single operating or controlling device both motors will be controlled as to their stopping, starting, and reversing, the arrangement providing for the starting of the motor connected to the hoisting-cable prior to the starting of the motor connected to the holding-cable, so as to close the bucket, and also providing for the continuation of the operation of the motor connected to the closing-cable in a reverse direction while the motor connected to the holding-cable is at rest, so as to permit the opening of the bucket and the discharge of its load.

In the accompanying drawings, Figure 1 is an elevation of a suitable crane with a bucket suspended therefrom and the motors for operating the same. Fig. 2 is a diagram of the controller for the motors. Fig. 3 is a plan view of the controller; Fig. 4, a horizontal section through the same; Fig. 5, an elevation fo the controller-drum; and Figs. 6 and 7 are respectively side elevation and plan view showing a modified form of controller.

The movable crane or frame from which the bucket is suspended is shown at 1 and is provided with the boom 2, from the outer end of which the bucket is suspended. This crane or frame may be of any desired construction, that shown on the drawings having been selected for purposes of illustration merely. The bucket is shown at 3, and this also may be of any preferred type of automatic opening and closing buckets, that shown in the drawings being of the clam-shell type; but this is not necessary. This bucket has connected thereto a cable 4, which passes around a drum 5, mounted in the bucket and connected to the two blades or scoops of the bucket in such manner that when the cable 4 is pulled the bucket will be closed. Also connected to said bucket is the holding-cable 7, which will be connected to the two scoops or blades of the bucket in such manner, as by means of the toggle-links 8, that when the bucket is suspended on said holding-cable it will automatically open to the position indicated at 9, Fig. 1. The cables 4 and 7 pass over suitable sheaves in the end of the boom 2 and thence to winding-drums 11 and 12, respectively. To each of these drums is connected a suitable motor, which may be of any preferred type, but preferably will be series-wound electric motors, said motors being indicated at 13 and 14, respectively.

As far as described the parts are all old and may be of any preferred type used for this work. Our invention has relation to means for controlling the motors 13 and 14 from a single operating handle or lever. This controlling means also may be of various forms and may be even adapted to other motors than electric motors. For instance, said means may be arranged to stop, start, and reverse a pair of steam-engines from a single operating-handle. While we have illustrated the controlling means as applied to electric motors, we wish it understood that the invention is not limited to this type of motors. When applied to electric motors, the controlling means may be of various forms, it merely being essential that by the movement of a single operating handle or lever the two motors can be operated in unison either to hoist or to lower the bucket and the arrangement being such that the hoisting-motor 13 will be started slightly in advance of the holding-motor 14, so as to close the bucket before the hoisting begins, and such that the hoisting-motor 13 may be run in a reverse direction while the holding-motor 14 is at rest, so as to slacken the hoisting-cable and throw the weight of the bucket on the holding-cable in order to open the same either for the purpose of dumping the load or preparatory to receiving a new load, all of these movements being secured by the movements of a single controlling-lever. In the drawings no attempt has been made to show all arrangements of controlling means whereby these movements can be secured; but we have shown two forms thereof to illustrate the principle.

In Fig. 2 is shown a diagram of a drum type of controller arranged to secure the desired result. In this diagram the armature of the hoisting-motor is shown at 15 and its field at 16, and the armature of the holding-motor is shown at 17 and its field at 18. The terminals of the hoisting-motor armature are shown at 19 and 20, and the terminals of the armature of the holding-motor are shown at 21 and 22. The terminal of the field of the hoisting-motor is shown at 23 and the terminal of the field of the holding-motor at 24. 25 indicates terminals of the different sections of the resistance device 26. 27 and 28 indicate, respectively, the positive and negative terminals of the controller. The different terminals named will be mounted in a suitable casing 29 and in proximity thereto will be mounted the usual drum 30, having thereon suitable contact-pieces arranged to close the circuit through the different terminals in the desired manner. This drum will be of the usual type and will be operated by means of an ordinary crank or handle 31, having thereon a detent or other means for engaging notches on the casing, so that said controller can be stopped in any desired position, as is usual with controllers of this type. The positive terminal 27 will preferably be a spring such as shown at 32 in Fig. 4. The drum will have thereon two series of contact-strips having between them a space 33, which when brought opposite the spring-terminal 32 will result in both motors coming to a stop. The two series of contact-pieces of the controller-drum will be similarly arranged. One of said series of contact-pieces—namely, that on section A—will provide for the driving of the motors to hoist the bucket, while the opposite series of contact-pieces—namely, that on section B—will provide for the movement of the motors in lowering the bucket, this result being accomplished by the cross connections between the field and armature contact-pieces, so that thereby a reverse movement of the motors may be secured. Each of the sections A and B of the controller-drum has on it a series of contact-strips 36 of varying length and arranged to contact with the terminals 25 of the resistance device, so that thereby the speed of the motors can be controlled. Both sections of the controller-drum also contain contact-strips 37 and 38 for contacting with the field-terminals 23 and 24, respectively, and other contact-strips 39 for contacting with the negative terminal 28, all of these contact-strips being of uniform length and symmetrically arranged on the two sets or sections of the drum. Each section of the controller-drum also contains a pair of contact-strips 40 for contacting with the terminals 21 and 22 of the armature of the hoisting-motor 13 and also a pair of strips 41 for contacting with the terminals 19 and 20 of the armature of the holding-motor 14. The contact-strips 41 on both sections of the drum are shorter than the contact-strips 40, and since the controlling-drum can be held with the extended portions only of contact-strips 40 in either section A or section B in contact with the terminals 21 and 22 the hoisting-motor alone will be driven either to hoist or to lower, while the holding-motor is at rest. The operation of this controller is as follows: We will assume that the bucket is open and resting upon a pile of coal or other material which it is desired to raise and that both motors are at rest. Under these conditions the contact-spring 32 will rest in the space 33 between the two sections A and B of the drum. The controller-drum will then be moved so as to bring the section A underneath the spring-terminal 32, but will be moved only far enough to cause the terminal 32 to bear against the end of the longest of the contact-strips 36 in section A and only far enough to cause the extended portions of the contact-strips 40 to contact with the terminals 21 and 22. In this position the current entering at terminal 27 will pass through the several windings of the resistance device 26, thence through the field-magnet 16 of the hoisting-motor to the terminal 23, contact-strip 37, and by the cross connection to one of the contact-strips 40, thence to terminal 22, through the armature 15 of the hoisting-motor to terminal 21, into the other one of the contact-strips 40 by the cross connection to contact-strip 39, and out at the terminal 28. The effect of this will be to start the hoisting-motor 15 while the holding-motor is still at rest, thus winding up the hoisting-cable 4 and closing the bucket, which in closing will scoop up a load of the material. The controlling-lever 31 will then be moved still farther in the same direction, so as to also bring the contact-strips 41 in section A into contact with the terminals 19 and 20. In this position the current, as before, will enter at terminal 27, pass through the resistance-coils 26, but will then divide, one portion going through the field-magnet 16 of the hoisting-motor and in the course above described through the armature of said motor. The other portion of the current will pass through the field-magnet 18 of the holding-motor, thence to terminal 24, into contact-strip 38, and by the cross connection to one of the contact-strips 41, thence to terminal 20, through the armature 17 of the holding-motor, to contact 19, into contact-strip 41, and thence by the cross connection to contact-strip 39 and out at the terminal 28. As soon as the contact-strips 41 come in contact with terminals 19 and 20 the holding-motor will also be started, and by moving the controlling-lever still farther in the same direction the resistance-sections 26 will be successively cut out, thus increasing the speed of the two motors; but said motors will run in unison as long as the drum remains in such position that the contact-strips 40 and 41 in section A are in contact with the terminals 19, 20, 21, and 22. As soon as the bucket has been raised to the desired height the drum will be moved in the opposite direction, again bringing the same to the zero position, thus stopping both motors. If it is desired to dump the load without first lowering the bucket, the controlling-drum will be moved in the opposite direction, but not more than two notches, so as to bring only the projecting ends of contact-strips 40 of section B into contact with the terminals 21 and 22 and also bringing the terminal 32 into contact with the longest contact-strips 36 in section B. This will start the hoisting-motor, but in the reverse direction, and the effect will be to slacken the hoisting-cable, thus throwing the entire weight of the bucket and its contents on the holding-cable and opening said bucket in the well-understood way to discharge its load. Should it be desired to lower the bucket before discharging its contents, the drum will be moved to bring the section B underneath the spring-terminal 32; but the drum will be moved to such extent and at such a speed that all four of the contact-strips 40 and 41 of section B will be brought practically simultaneously into contact with the terminals 19, 20, 21, and 22. As a result both motors will be reversed simultaneously, thus lowering the bucket without throwing the weight thereof on the holding-cable. By moving the drum still farther in the same direction the resistance-sections will be cut out and the lowering speed increased to the desired extent. When said bucket has been lowered sufficiently far, the drum will be moved in the opposite direction until the contact-strips 41 pass off the terminals 19 and 20, but leaving the contact-strips 40 in contact with the terminals 21 and 22. This will bring the holding-motor to a stop, but will permit the hoisting-motor to continue in its reverse movement, thus slackening the hoisting-cable and throwing the entire weight of the bucket and its contents on the holding-cable and opening said bucket. It will thus be observed that by the movement of a single controlling-lever in either of two directions the two motors can be absolutely controlled and can be operated in unison, either for lowering or raising the bucket, or the holding-motor can be stopped while the hoisting-motor is continued to rotate in either direction for the purpose of either closing the bucket or permitting the opening thereof. In Figs. 6 and 7 we have shown another controlling means adapted to perform this function. As shown in said figures there are two controller-drums—a drum 45 for controlling the hoisting-motor and a drum 46 for controlling the holding-motor. These two drums are geared together, so that the movement of one of said drums will be communicated to the other, thus dispensing with separate controlling-handles for the two drums. This result can be accomplished by a variety of ways—as, for instance, by providing each of the drums with a spur-gear 47, which meshes with an intermediate gear 48. The operating-handle 31 can be connected to either the intermediate gear 48 or to the gear 47 on the drum 45. The contact-strips shown in section A, Fig. 2, will be placed upon the drum 45, and the contact-strips shown in section B, Fig. 2, will be placed upon the drum 46, and these contact-strips can be of the relative lengths shown in Fig. 2, so as to secure the starting of the hoisting-motor prior to the starting of the holding-motor. If preferred, however, the contact-strips 40 and 41 on the two drums 45 and 46 may be of identically the same length, in which event provision will be made for starting the drum 45 slightly in advance of the drum 46. One way of accomplishing this is by providing the gear 47 of the drum with a blank portion 50 and providing the intermediate gear 48 with a similar blank portion 51, these two blank portions being of such length as to permit the drum 46 to remain at rest during the desired interval of rotation of the intermediate gear 48.

It will be obvious to those skilled in the art that a large variety of arrangements of controlling devices may be used and also that the specific arrangement of wiring and connections illustrated in the drawings may be varied to meet special requirements and conditions. In case the current supplied to the motors is very heavy the drum may be placed in secondary circuits for the purpose of operating electromagnetic devices which control circuit-closers in the main circuits. All such modifications fall within the principle of our invention and are intended to be covered by the claims as worded, and no limitation is to be imposed upon the claims either by the specific devices shown in the drawings or described in the specification.

In all arrangements of our device there are practically independent circuit-controlling means for the two motors. In Fig. 2 the two sections A and B of the controlling-drum are practically independent, the drum merely serving as a mechanical connection between the same, somewhat the same as the gear between the two drums shown in Figs. 6 and 7.

What we claim as our invention, and desire to secure by Letters Patent, is—

1. In a system of motor control, the combination with two motors, of independent starting and stopping means therefor, a single operating means, and connection between the same and said starting and stopping means so arranged that by a single movement of said operating means in one plane both of said motors may be put and maintained in operation, and one thereof started in advance of the other.

2. In a system of motor control, the combination with two motors, of independent starting and stopping means therefor, a single operating means, and connections between the same and said starting and stopping means so arranged that by a single movement of said operating means in one plane both of said motors may be driven in unison in either direction or one of said motors held at rest while the other motor is driven in either direction.

3. In a system of motor control, the combination with two electric motors, of independent starting and stopping means therefor, a single operating means, and connections between the same and said starting and stopping means so arranged that by a single movement of said operating means in one plane both of said motors may be started, either simultaneously or one before the other, and whereby one may be continued in operation after the other comes to rest.

4. In a system of motor control, the combination with two electric motors, independent starting and stopping means therefor, a single operating means, and connections between the same and said starting and stopping means so arranged that by a single movement of said operating means in one plane both of said motors may be driven in unison in either direction and one thereof may be started in advance of the other and continue to run after said other is brought to a stop.

5. In a system of motor control, the combination with two electric motors, of independent circuit-closing means for said motors, a single operating lever or handle movable in one plane only, and connections between the same and said circuit-closing means arranged to permit the closing of the circuit to both motors, and to one of said motors in advance of closing the circuit to the other motor.

6. In a system of motor control, the combination with two electric motors, of independent circuit-closing means for said motors, a single operating lever or handle movable in one plane only, and connections between the same and said circuit-closing means so arranged that said motors may be driven in unison in either direction or one of said motors held at rest and the other motor driven in either direction.

7. In hoisting apparatus the combination with an automatically opening and closing bucket, of a holding-cable therefor, a hoisting-cable therefor, two motors to which said cables are respectively connected, independent starting and stopping means for said motors, a single operating means and connections between the same and said starting and stopping means so arranged that both of said motors may be started by a single movement of said operating means and one in advance of the other.

8. In hoisting apparatus, the combination with an automatically opening and closing bucket, of a holding-cable therefor, a hoisting-cable therefor, two motors to which said cables are respectively connected, independent starting and stopping means for said motors, a single operating means, and connection between the same and said starting and stopping means so arranged that both of said motors may be driven in unison in either direction or the holding-motor held at rest and the hoisting-motor driven in either direction.

9. In hoisting apparatus, the combination with an automatically opening and closing bucket, of a holding-cable therefor, a hoisting-cable therefor, two electric motors to which said cables are respectively connected, independent starting and stopping means therefor, a single operating lever or handle, and connections between the same and said starting and stopping means so arranged that both of said motors may be driven in unison in either direction and the hoisting-motor started in advance of the holding-motor.

10. In hoisting apparatus, the combination with an automatically opening and closing bucket, of a holding-cable therefor, a hoisting-cable therefor, two electric motors to which said cables are respectively connected, independent circuit-closing means for said motors, a single operating lever or handle, and connections between the same and said circuit-closing means, the arrangement being such that both of said circuit-closing means will be operated by a single movement of the operating-handle and the circuit to the hoisting-motor will be closed in advance of closing the circuit to the holding-motor.

11. In hoisting apparatus, the combination with an automatically opening and closing bucket, of a holding-cable therefor, a hoisting-cable therefor, two electric motors to which said cables are respectively connected, independent starting, stopping and reversing means for said motors, a single operating lever or handle, and connections between the same and said starting, stopping and reversing means, the arrangement being such that the circuit to both of said motors will be closed or opened or reversed by movements of the one operating-handle and the circuit to the hoisting-motor may be closed in advance of the closing of the circuit to the holding-motor, and may be opened after the circuit to the holding-motor is opened.

In testimony whereof we, the said LEWIS J. ROBB and WILLIAM M. ROSEWATER, have hereunto set our hands.

LEWIS J. ROBB.
WILLIAM M. ROSEWATER.

Witnesses:
ROBERT C. TOTTEN,
G. C. RAYMOND.